May 28, 1957 G. E. HOPPE 2,794,073

CROSS BAR TRANSLATOR SWITCH

Filed Sept. 10, 1952 4 Sheets-Sheet 1

INVENTOR
G. E. HOPPE
BY J. W. Schmied
ATTORNEY

May 28, 1957 G. E. HOPPE 2,794,073

CROSS BAR TRANSLATOR SWITCH

Filed Sept. 10, 1952 4 Sheets-Sheet 2

INVENTOR
G. E. HOPPE
BY J. H. Schmied
ATTORNEY

May 28, 1957 G. E. HOPPE 2,794,073

CROSS BAR TRANSLATOR SWITCH

Filed Sept. 10, 1952 4 Sheets-Sheet 3

INVENTOR
G. E. HOPPE
BY J W Schmied
ATTORNEY

May 28, 1957 G. E. HOPPE 2,794,073

CROSS BAR TRANSLATOR SWITCH

Filed Sept. 10, 1952 4 Sheets-Sheet 4

INVENTOR
G. E. HOPPE
BY
J. W. Schmied
ATTORNEY

United States Patent Office 2,794,073

Patented May 28, 1957

2,794,073

CROSS BAR TRANSLATOR SWITCH

Gustav E. Hoppe, Brooklyn, N. Y., assignor to Bell Telephone Laboratories, Incorporated, New York, N. Y., a corporation of New York Application September 10, 1952, Serial No. 308,890

13 Claims. (Cl. 179—18)

This invention relates to electromechanical translators and more particularly to an electromechanical translator switch of the cross bar type.

Heretofore in the prior art as utilized in telephone switching systems, accounting systems, computers, business machines, and the like, the various translations from one code to another have been achieved either by pluralities of route relays or by electromechanical card devices. Translators have been employed, for example, in telephone systems to effect interconnection between different automatic telephone systems, or between two automatic telephone exchanges employing different combinations of code groups, or for many other operations in automatic telephone offices. As more automatic telephone dial exchanges are interconnected in an expanding network, the necessity for rapid and reliable translation of one signaling code to another becomes increasingly important.

The relay translators utilized in the prior art have a plurality of contacts on each route relay which are connected to points on the translation field by means of a plurality of soldered cross-connections. In telephone switching systems, for example, when a customer dials a number, a route relay operates from a code point which corresponds to the office code digits dialed by the customer. A plurality of operated contacts on the route relay furnish a translation to the marker or to a similar type circuit. Suppose, in such a system as used in telephony where it is necessary to translate each of ten thousand numbers into other numbers, it becomes desirable or necessary to change the cross-connections so that a given number which was translated into a second number would be translated into a third number. This procedure involves, in relay translators, difficult changing of electrical connections, and since these translation changes are frequently necessary, the required operations of unsoldering and removing, rerunning and resoldering cross-connections often become prohibitive. Moreover due to the large numbers of cross-connections needed relay translators occupy a relatively large amount of space, which is often excessive in relation to the available space.

In accordance with the use of the present invention the utilization of a translation field which is represented by a plurality of light responsive devices as utilized in the prior electromechanical art is unnecessary. Both the prior art relay translator and the electromechanical translator require the changing of components to effect a change in translation; the relay translator requires soldering operations and the electromechanical translator requires changing of cards or other components. Both the prior art relay translator and the electromechanical translator, moreover, do not provide any visual indication of the translation change.

It is then an object of the present invention to provide for a novel translator in which translation changes can be made without changing or removing any of the components of the translator.

Another object of the present invention is to provide for a novel translator which has a visual indication as to the accuracy of the translation field.

The present invention accomplishes these objects and overcomes the difficulties as presented by the prior art by providing for an electromechanical translator which employs a cross bar type mechanism in which a plurality of vertical bars are equipped with a plurality of slidable mounted finger members which engage corresponding pins on adjacent horizontal bars to close spring contacts at the end of each horizontal bar. The slidable finger members represent the translation field and provide for a visual indication of the translation code. Translator coding may be changed simply by moving any of the slidable fingers to a different position, or by changing a vertical bar.

It is then another object of the present invention to provide for a small compact and economical electromechanical translator of the cross bar type.

Still another object of the present invention is the provision of a novel electromechanical switch which retains the flexibility and speed of relay translators.

Still another object of the present invention is the provision of an electromechanical switch having a single row of make contacts common to the code bars to effect a reduction in the number of make contacts.

Still another object of the present invention is to provide for a novel electromechanical translator which eliminates the necessity of changing soldered cross-connections.

Still another object of the present invention is the provision of a novel electromechanical switch in which translation changes can be made economically and rapidly so as to reduce considerably the length of time that the common control circuits are out of service.

Still another important object of the present invention is the provision of a novel slidable finger which replaces a soldered cross-connection.

Further objects and advantages will become evident to those skilled in the art upon consideration of the following description taken in conjunction with the drawings wherein.

Figure 2:
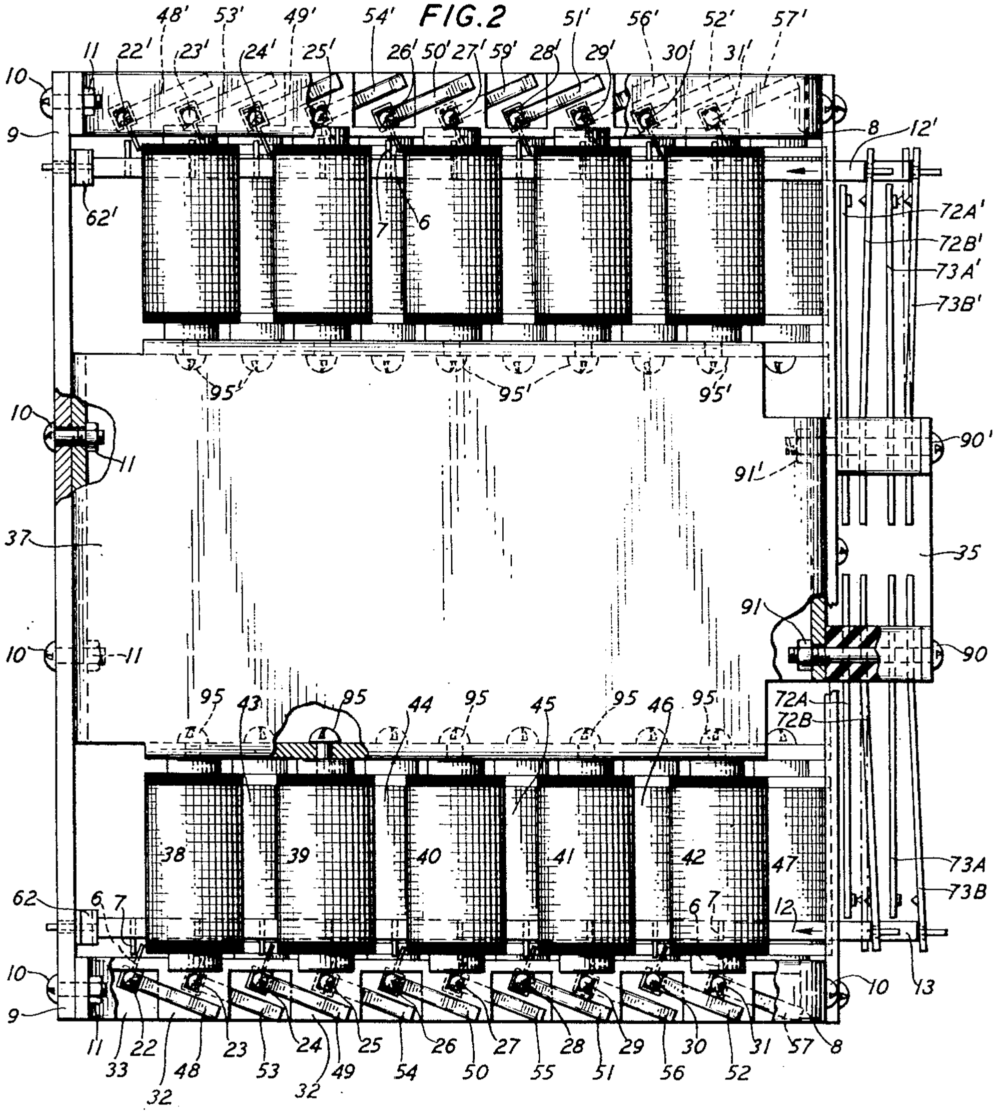
Fig. 2 is a top view of the electromagnetic switch of the present invention.
Figure 3:
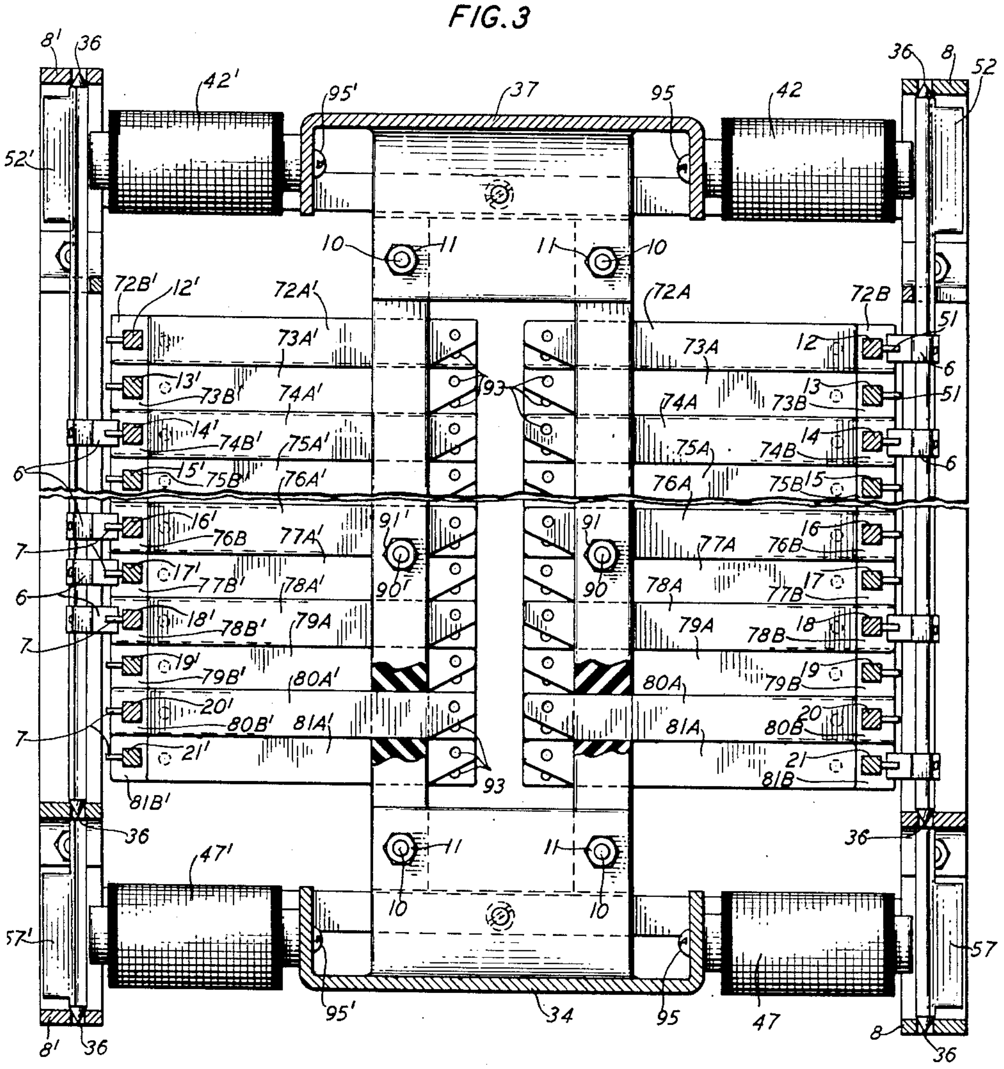
Fig. 3 is a view along line 3—3 of Fig. 1.
Figure 4:
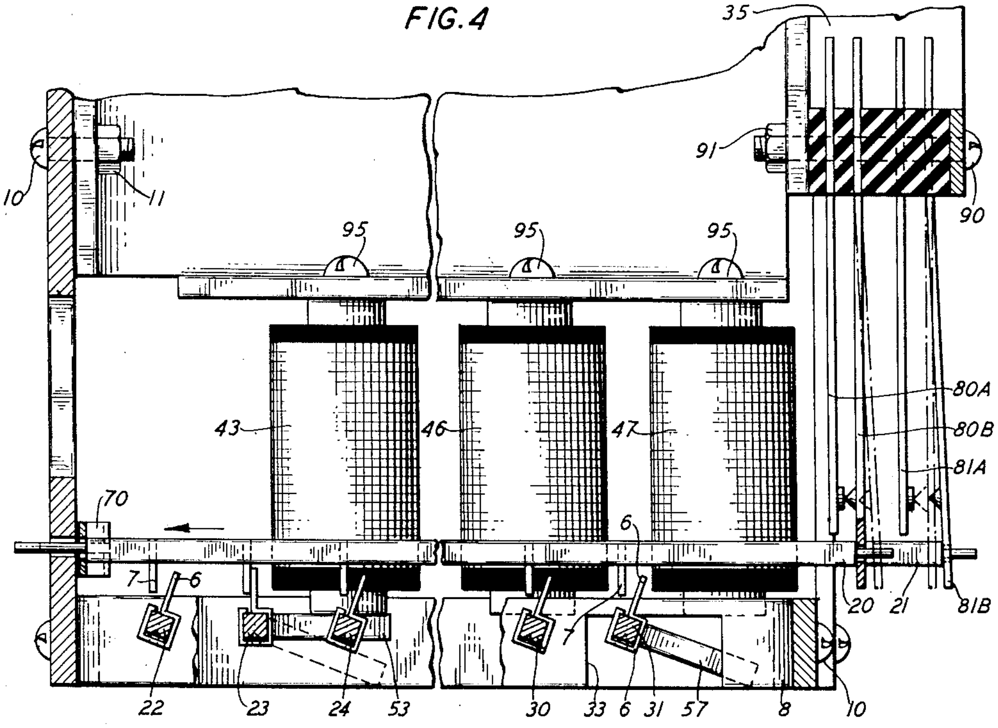
Fig. 4 is a partial top view of the electromagnetic switch of the present invention illustrating the operation of the code bars.
Figure 5:
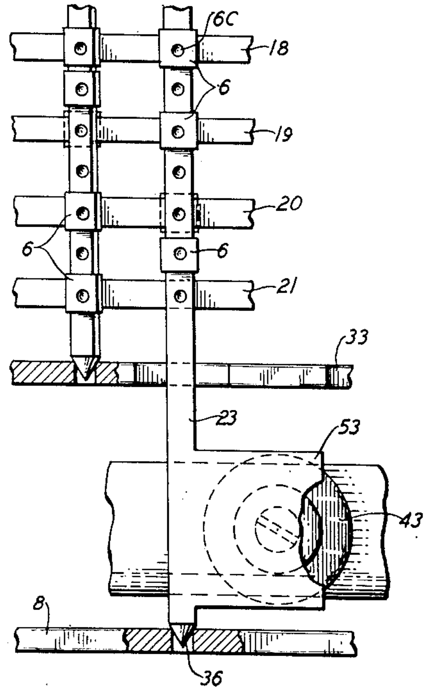
Fig. 5 is an enlarged partial front view of the cross bars of the present invention illustrating the positioning of the fingers.

The translator switch of the present invention, except for the coding features as are hereinafter described, is a symmetrically arranged structure. Referring to Fig. 2 which is a top view of the translator switch, the lower portion of the figure, or the front half of the translator switch is symmetrical with the upper portion or the back half. The symmetrical components are designated by unprimed numerals for the front half and primed numerals for the back half. The description which follows relating to the front half utilizing unprimed numerals therefore relates as well to the symmetrical back half and the primed numerals.

The two symmetrical halves are mechanically connected together by an end plate 9 and the supports 34, 35 and 37, Figs. 1 through 4. The end plate 9 is connected to the supports 34 and 37 and to symmetrical frames 8 and 8' by the screws 10 and nuts 11. The supports 34 and 37 are connected by the support 35, hereinafter described, to form a rigid structure with the frames 8 and 8′ and the end plate 9. The frame 8 and end plate 9 have rigidly attached thereto an upper support 32, and a lower support 33 also by screws 10 and nuts 11. The upper support 32, the lower support 33 and the frame 8 each has a plurality of bearings 36 which support ten vertical code bars 22 through 31. Due to the symmetrical arrangement as described above and as shown in Fig. 2, there are also ten vertical bars 22′ through 31′. The upper support 32 and the frame 8 support the vertical code bars 23, 25, 27, 29 and 31, and the lower support 33 and the frame 8 support the vertical code bars 22, 24, 26, 28 and 30. The end plate 9, supports 32, 33, 34 and frame 8 are joined or bolted together as described above by means of a plurality of screws 10 and nuts 11. The supports 34 and 37, together with the frame 8, carry ten electromagnets 38 through 47 utilizing screws 95. The frame 8′ and supports 34 and 37 carry ten electromagnets 38′ through 47′. When any of the electromagnets 38 through 47 are energized, the corresponding vertical code bars 22 through 31 are rotated as is hereinafter described. The code bars 22 through 31 support as a part thereof the armatures 48 through 57. The armatures 48 through 57 are associated respectively with the electromagnets 38 through 47 so that when one of the electromagnets 38 through 47 is energized it attracts the respective armature 48 through 57 thereto, causing the respective code bar 22 through 31 to rotate therewith. For example, when the electromagnet 43 is energized it attracts the armature 53 and causes the code bar 23 to rotate in a counter-clockwise direction as shown in Fig. 2. The rotation of the code bar 23 actuates a combination of horizontal bars 12 through 21 hereinafter described.

Figure 6:
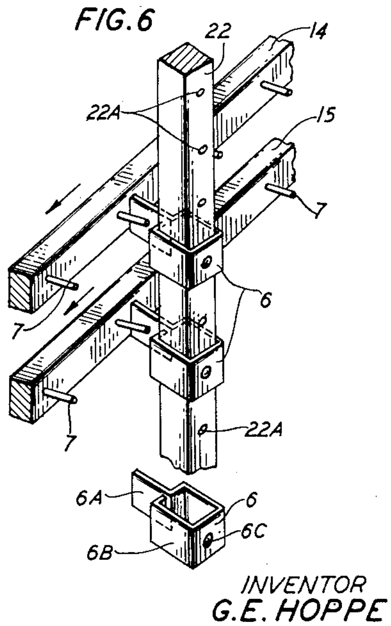
Fig. 6 is a pictorial view of a cross bar and horizontal bars of the present invention.

Each of the code bars 22 through 31 carries a plurality of slidable fingers 6 which are shown more specifically in the enlarged view of Fig. 6. Each of the slidable fingers 6 is of resilient material and has an engaging arm 6A, an open rectangular body portion 6B and a detent 6C. The detent is an internal convex portion that engages or mates with the recessions 22A on the vertical bars 22 through 31. The recessions 22A are on the bars 22 through 31 at each intersection of the vertical bars 22 through 31 and the horizontal bars 12 through 21 hereinafter described and also between each of the intersections so that a finger 6 can be supported at an intersection or therebetween. Instead of the detent 6C and recession 22A, any other connecting or supporting means may be utilized such as screws, fasteners, etc. Any fastening or gripping means would be sufficient as long as the fingers 6 cannot move or shift their position during the operation of the cross bar translator.

Figure 1:
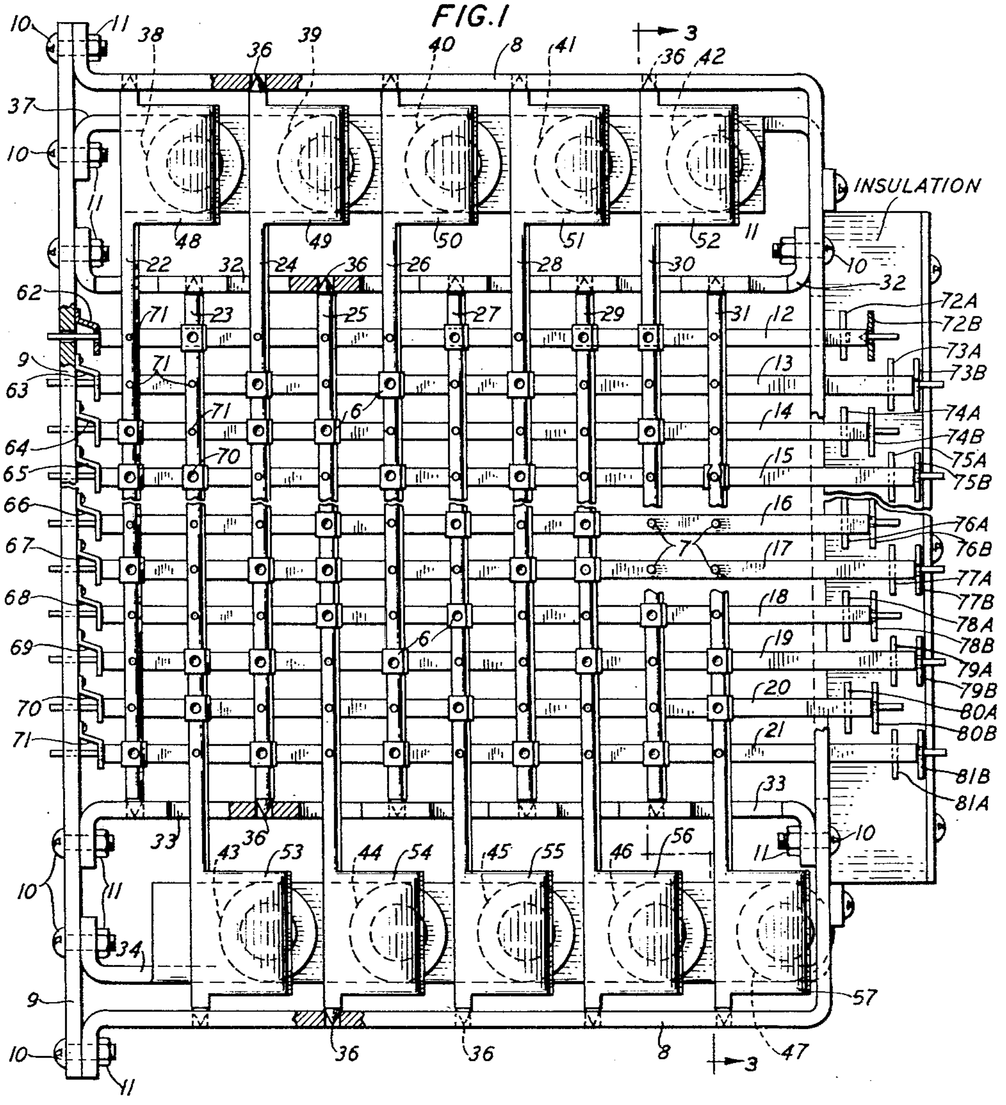
Fig. 1 is a front view of the electromagnetic switch of the present invention.

The slidable or adjustable fingers 6 on the vertical code bars 22 through 31 engage a plurality of pins 7 on the horizontal bars 12 through 21. The horizontal bars 12 through 21 are supported at one end by the end plate 9 and at their other ends by the movable contacts 72B through 81B, hereinafter described. The ends of the horizontal bars 12 through 21 in the end plate 9 slide therein so that the horizontal bars are longitudinally or axially movable. The present invention is not necessarily limited to the ten horizontal bars 12 through 21 shown as any number of horizontal bars may be utilized. The vertical bars 22 through 31 are shown broken between the horizontal bars 15 and 16 to allow for any additional number thereof. For example, there may be fifty horizontal bars on each symmetrical half so that there would be one hundred in all. Each of the horizontal bars 12 through 21 supports a pin 7 at each crossing of the respective horizontal bar 12 through 21 with a code bar 22 through 31. The pins are small, cylindrically shaped objects which protrude sufficiently from the horizontal bars 12 through 21 to engage the fingers 6 on the code bars 22 through 31 as shown specifically in Fig. 6. When a pin 7 is engaged by a finger 6 in accordance with the translation as is hereinafter described, the corresponding horizontal bar 12 through 21 is moved to the left as shown in Figs. 1, 2, 4, 5 and 6. The horizontal bars 12 through 21 are resiliently urged towards the right by the springs 62 through 71 which are supported on the end plate 9. The movable contacts 72B through 81B are resilient members as well as the springs 62 through 71 and are supported together with the contacts 72A through 81A by the screw 90 and nut 91 on the support 35. The springs 62 through 71, however, are of sufficient strength to overcome the spring action of the movable contacts 72B through 81B when the electromagnets 38 through 47 are unenergized so that horizontal bars 12 through 21 are normally in position to the right. When the electromagnets 38 through 47 are not energized the code bars 22 through 31 through the fingers 6 do not bear against the engaging pins 7 to cause an opposing pressure upon the springs 62 through 71. When, however, one of the electromagnets 38 through 47 is energized it attracts the respective armature 48 through 57, rotating the respective code bar 22 through 33 and through the action of the fingers 6 on the pins 7 moves a combination of horizontal bars 12 through 21 to the left depending upon the position and number of the fingers 6. As the combination of horizontal bars 12 through 21 is moved towards the left overcoming the restoring action or the restraining action of the respective combination of springs 62 through 71, the respective movable contacts 72B through 81B close with the stationary contacts 72A through 81A. This action is shown specifically in the enlarged view of Fig. 4 where the code bar 23 is shown in its activated position so that the contacts 80A and 80B are closed. When one of the electromagnets 38 through 47 is deenergized after having been energized, the respective armature 48 through 57 and code bar 22 through 31 restore to their normal position as shown in Fig. 1. As the plurality of rotated slidable fingers 6 remove their pressure on the respective of the pins 7, the plurality of horizontal bars 12 through 21 that were actuated to the left now restore to the right opening the contacts 72B through 81B and 72A through 81A.

When a customer or operator in a telephone system keys or dials a call, one of the electromagnets 38 through 47 on the cross bar translator switch described above is energized from a code point which corresponds to the code digits keyed or dialed. The energized electromagnet, for example, 43, causes the rotation of the armature 53 and code bar 23. The plurality of slidable fingers 6 on the code bar 23 actuate the plurality of horizontal bars 12, 15, 19 and 20, as shown in Fig. 1, causing the pairs of contacts 72A—72B, 75A—75B, 79A—79B, and 80A—80B to close. The closed contacts 79A—79B and 80A—80B furnish a translation to associated circuits and apparatus, not shown, such as a decoder, marker or similar circuits which are connected to the outputs 93 in Fig. 3. The marker uses the translation to establish a connection through the switching office and also to instruct the sender or similar circuit, also not shown, how to handle the call. A translation provided by one of the code bars 22 through 31 is established by the setting of the slidable fingers 6. The fingers 6 may be moved or shifted to any of the cross-points or intersections between the horizontal bars 12 through 21 and the vertical bars 22 through 31. Translation changes are therefore made simply by shifting one or more of the slidable fingers 6 on its respective code bar 22 through 31. It is evident therefore that the number of slidable fingers 6 set on one of the code bars 22 through 31 would be determined by the number of pieces of information required by the translation. The fingers 6 on the code bars 22 through 31 that are not required can be positioned between cross-points as described above so that they do not engage the pins or protrusions 7. When number of items or pieces of information required in one translation exceeds the capacity of one of the symmetrical halves of the translator, both halves or two or more translators may be used. The translation can be checked usually simply by observing the position of the fingers 6 on the code bars 22 through 31. The translation can be changed instead of moving or shifting the fingers 6, by having a finger at each cross-point and removing and inserting the pins 7. Both the shifting of the fingers 6 or changing the pins 7 effect the same result. The pins 7 need not necessarily be removed completely as long as they can be moved to disengage the fingers 6. If the pins 7 are changed instead of the fingers 6 moved, the fingers 6 need not be slidable but may simply be protrusions at each cross-point. Route advance and operation of peg count registers can be provided if desired, by the inclusion of separate contacts, not shown, on the vertical bars. The rotation of the vertical bars would operate these contacts simultaneously with the actuation of the horizontal bars.

Various other embodiments of the invention may be made by those skilled in the art without departing from the spirit of the invention as defined in the scope of the appended claims.

What is claimed is:

1. An electromechanical translator switch comprising two perpendicular sets of bars, the bars in the first of said sets being rotatable and the bars in the second of said sets being movable longitudinally; a plurality of adjustable finger members slidably mounted on each bar of said first set; means on each bar of said second set at the points of intersection of said two sets mating with and responsive to the movement of said adjustable finger members; a plurality of electrical contact springs associated with each bar of said second set; and means for rotating selected bars of the first of said sets of bars.

2. A cross bar translator comprising a plurality of rotatable bars; a plurality of longitudinally movable bars; adjustable means on said rotatable bars for moving selected pluralities of said longitudinally movable bars responsive to the rotation of one of said rotatable bars, said adjustable means being movable axially along said rotatable bars; means for rotating selected ones of said rotatable bars; and contact means associated with each of said longitudinally movable bars operable responsive to the movement thereof.

3. A cross bar translator switch comprising a plurality of rotatable vertical code bars; a plurality of axially movable, horizontal bars; a plurality of finger members on each of said vertical bars at selected points of intersection of said vertical and horizontal bars; detent means for holding said finger members in position at and between the points of intersection of said horizontal and vertical bars; a pin on said horizontal bars at each intersection of said horizontal and vertical bars, said finger members being slidable on said vertical bars to change the translation code and engaging the corresponding ones of said pins at the respective points of intersection of said horizontal and vertical bars; and electromagnetic means for rotating selected ones of said vertical bars, to cause said finger members on said rotated vertical bars to engage the registering ones of said pins to move said horizontal bars having pins so engaged.

4. A cross bar translator switch comprising a plurality of rotatable vertical code bars; a plurality of axially movable, horizontal bars; a plurality of fingers on each of said vertical bars, each at some one of the intersections of said vertical and horizontal bars; holding means for maintaining said fingers in position at said intersections; a plurality of protrusions on said horizontal bars, one of said protrusions being at each of said intersections, said fingers bearing against the corresponding ones of said protrusions and being movable on said vertical bars from one of said protrusions to another to effectively change the translation code; a plurality of spring contacts associated with and operable by said horizontal bars; and electromagnetic means for rotating selected ones of said vertical bars, the rotation of said vertical bars and the rotation of said fingers thereon moving said protrusions bearing against said rotated fingers, and the corresponding ones of said horizontal bars supporting said protrusions, to operate said spring contacts associated with said moved horizontal bars.

5. An electromechanical translator switch comprising two perpendicular sets of bars, the bars in the first of said sets of bars being rotatable and the bars in the second of said sets of bars being movable longitudinally; a plurality of adjustable finger members slidably mounted on each of said first set of bars; means on the said second set of bars at the points of intersection of said two sets of bars mating with and responsive to the movement of said adjustable finger members; a plurality of electrical contact springs associated with said second set of bars; and means for rotating selected ones of said first set of bars, said adjustable finger members providing a visual indication of the accuracy of the translation.

6. A cross bar translator switch comprising a plurality of rotatable vertical code bars; a plurality of axially movable, horizontal bars; a plurality of fingers on each of said vertical bars at some of the intersections of said vertical and horizontal bars; holding means for maintaining said fingers in position at said intersections; a plurality of pins on said horizontal bars; one of said pins being at each of said intersections, said fingers bearing against the corresponding ones of said pins and being movable on said vertical bars from one of said pins to another to effectively change the translation code, the position of said fingers providing a visual indication of the translation code; a plurality of spring contacts associated with and operable by said horizontal bars; a plurality of restoring springs resiliently deformed by the movement of said horizontal bars; and electromagnetic means for rotating selected combinations of said vertical bars, the rotation of said vertical bars and the rotation of the corresponding of said fingers thereon moving said pins bearing against said rotated fingers and moving the corresponding ones of said horizontal bars supporting said pins to operate said spring contacts associated with said moved horizontal bars.

7. A cross bar translator switch comprising a plurality of rotatable vertical code bars; a plurality of axially movable, horizontal bars; a plurality of finger members on each of said vertical bars at selected ones of the intersections of said vertical and horizontal bars; detent means for holding said finger members in position at the intersections of said horizontal and vertical bars; detent means for holding the unused ones of said fingers between said intersections; a pin on said horizontal bars at each intersection of said horizontal and vertical bars, said finger members being slidable on said vertical bars to change the translation code and to engage the corresponding ones of said pins at the respective intersection of said horizontal and vertical bars, said finger members providing a visual indication of the translation code; and electromagnetic means for rotating selected ones of said vertical bars, thereby to cause said finger members on said rotated vertical bars to move the respective ones of said pins and horizontal bars.

8. An electromechanical translator comprising electrical actuating means; a plurality of coding members selectively rotatable by said actuating means; a plurality of information members; means for moving selected ones of said information members upon and responsive to the rotation of each of said rotatable members, said means including extensions on said coding members, said extensions being adjustable in accordance with a distinctive code; and a plurality of output members controlled by said information members.

9. A translating arrangement comprising a plurality of input and output devices; a plurality of rotatable and a plurality of axially movable cross bars; extensions on each one of said plurality of rotatable cross bars, said extensions being adjustable in accordance with a distinctive code for each of said rotatable cross bars; means for rotating selected ones of said rotatable cross bars responsive to the energization of selected ones of said input devices; means for moving selected ones of said axially movable cross bars corresponding to said extensions in response to the rotation of any one of said rotatable cross bars; and means operable by each of said axially movable cross bars controlling the operation of said output devices.

10. A translating arrangement comprising a plurality of input and output devices; a plurality of rotatable and a plurality of movable members; radial extensions on said rotatable members and on said movable members, some of said extensions being adjustable, said adjustable extensions being positioned thereon in accordance with a distinctive code; means for rotating selected ones of said rotatable members responsive to the operation of selected ones of said input devices; and means including said extensions for moving selected ones of said movable members, thereby to operate selected ones of said output devices.

11. A cross bar switch comprising in combination a group of operable select elements, a group of operable selectable elements, and mechanical means adjustable in accordance with a distinctive code and supported on each one of said select elements for selectively operating a plurality of said selectable elements in response to the operation of any one of said select elements.

12. A cross bar switch comprising in combination a group of operable select elements, a group of operable selectable elements, and mechanical means adjustable in accordance with a distinctive code and supported on each one of said select elements for selectively operating one of said selectable elements in response to the operation of any one of said select elements.

13. A cross bar switch comprising in combination a group of operable select elements, a group of operable selectable elements and means adjustable in accordance with a distinctive code and supported on each one of said select elements for selectively operating a different one of said selectable elements in response to the operation of a different one of said select elements.

References Cited in the file of this patent

UNITED STATES PATENTS

| | | |
|---|---|---|
| 1,972,289 | Chauveau | Sept. 4, 1934 |
| 2,267,936 | Marrison | Dec. 30, 1941 |
| 2,479,678 | Graybill | Aug. 23, 1949 |
| 2,519,849 | Ostline | Aug. 22, 1950 |
| 2,576,785 | Dohkelarr | Nov. 23, 1951 |
| 2,577,468 | Knos | Dec. 4, 1951 |
| 2,604,542 | Hersey | July 22, 1952 |
| 2,741,699 | Barnett | Apr. 20, 1956 |